(12) United States Patent
Monda et al.

(10) Patent No.: US 10,613,040 B1
(45) Date of Patent: Apr. 7, 2020

(54) AIMING SYSTEM

(71) Applicant: National Technology & Engineering Solutions of Sandia, LLC, Albuquerque, NM (US)

(72) Inventors: Mark J. Monda, Albuquerque, NM (US); Clinton G. Hobart, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 16/151,559

(22) Filed: Oct. 4, 2018

Related U.S. Application Data

(60) Provisional application No. 62/720,205, filed on Aug. 21, 2018.

(51) Int. Cl.
  *G01N 23/04* (2018.01)
  *F42D 5/04* (2006.01)
(52) U.S. Cl.
  CPC .............. *G01N 23/04* (2013.01); *F42D 5/04* (2013.01); *G01N 2223/316* (2013.01); *G01N 2223/32* (2013.01)

(58) Field of Classification Search
  CPC ...................................................... G01N 23/04
  See application file for complete search history.

(56) References Cited

U.S. PATENT DOCUMENTS

| | | | |
|---|---|---|---|
| 8,746,561 B1 | 6/2014 | Gladwell et al. | |
| 9,055,886 B1 | 6/2015 | Garretson et al. | |
| 9,186,116 B2 | 11/2015 | Garretson et al. | |
| 9,261,337 B1 | 2/2016 | Monda | |

*Primary Examiner* — Hugh Maupin
(74) *Attorney, Agent, or Firm* — Daniel J. Jenkins

(57) ABSTRACT

An aiming system including a first member securable to a device having a point source, a second member selectably rotatable about a first axis relative to the first member, a third member selectably rotatable about a second axis oriented non-parallel to the first axis, and an aiming member having a third axis. The aiming system including the aiming member connected to the third member. A selectable rotation about each of the first axis and the second axis can be independently performed. During the selectable rotation about each of the first axis and the second axis with the aiming member in a first position, the point source, a point on the first axis, a point on the second axis, a point on the third axis are maintained mutually coincident with each other.

20 Claims, 4 Drawing Sheets

AIMING SYSTEM

CROSS-REFERENCE TO RELATED APPLICATIONS

This application claims the benefit of U.S. Provisional Application No. 62/720,205, filed Aug. 21, 2018, entitled "AIMING SYSTEM," which is incorporated herein by reference.

GOVERNMENT INTEREST STATEMENT

This invention was made with Government support under Contract No. DE-NA0003525 awarded by the United States Department of Energy/National Nuclear Security Administration. The U.S. Government has certain rights in this invention.

FIELD OF THE INVENTION

The present invention is directed to an aiming system and method for aiming a collimated beam device.

BACKGROUND OF THE INVENTION

Disrupters are mechanisms that are configured to emit a projectile towards the target for purposes of disrupting or disabling a target, where disruption of the target refers to inhibiting the target from performing a task, while disablement of the target refers to preventing the target from performing the task (e.g., through destroying the target). For example, a disrupter has conventionally been employed for purposes of disrupting and disabling an explosive device, such as an improvised explosive device (IED). In a more specific example, a disrupter has conventionally been used to disrupt or disable a battery, such as a 9V battery, in an explosive device. The disrupter is aimed at the battery, and a projectile emitted from the disrupter impacts the battery, thereby, for example, disabling the battery (and thus the explosive device).

Conventional means, however, for aiming a disrupter towards a target are relatively imprecise. While aiming precision is not necessary for all applications of disrupting or disabling a target, in many scenarios, higher precision in aiming the disrupter may be desirable, such as when componentry of electronics coupled to an explosive is desirably analyzed to ascertain information pertaining to an explosive device, such as the manufacturer of the explosive device, place of origin of the explosive device, etc.

SUMMARY OF THE INVENTION

Described herein are various technologies pertaining to relatively precisely aiming a disrupter with respect to a target, wherein the disrupter can be aimed with precision. An exemplary system includes a radiation generating device or device or a radiation source (e.g., an x-ray source) that is configured to emit radiation towards a proximal side of a target. In an example, the target may be or include a component of an explosive device, a surface-mounted circuit component, or the like. A detector is positioned on an opposite side of the target from the radiation source, such that the detector detects radiation emanating from a distal side of the target. Accordingly, through utilization of the radiation source and the detector, a radiographic image of the target can be generated.

The system additionally includes an aiming device that is positioned between the radiation source and the proximal side of the target when the radiographic image is generated. Thus, the radiographic image can include the target and the aiming device superpositioned thereon. A position in the radiographic image of the aiming device is referred to as an aim point. An analyst can review the radiographic image and ascertain if the aim point is at a desired location relative to the target. If the position of the aim point is not at the desired location relative to the target, the analyst can cause the position of the aiming device to be adjusted. A new radiographic image is then generated, and a location of the aim point in the new radiographic image is reviewed by the analyst. This process can repeat until the aim point is at the desired location in a radiographic image. In one embodiment, the system may utilize a grid aiming arrangement that does not require iteration and multiple radiographic images during adjustment of the aim point, which grid aiming arrangement may represent a "grid board" identified by software.

When the analyst indicates that the aim point is at the desired location, the analyst can cause a disrupter to be aimed at the target at a location thereon that corresponds to the location of the aim point on the target in the radiographic image. With more specificity, the disrupter is configured to emit a disrupting entity (e.g., a projectile, a laser beam, etc.) along a projecting axis, and the disrupter can be positioned such that the projecting axis intersects the location on the target that corresponds to the location of the aim point in the radiographic image. Positioning of the disrupter in this manner can be accomplished by way of a variety of techniques. For instance, the aiming device can be an attachment to a housing of the radiation source, and can be detached when the aim point is at the desired location. The disrupter can also be an attachment to the housing, and can replace the aiming device when the aim point is at the desired location. In another example, the aiming device and the disrupter can be mechanically linked (e.g., coupled to a common shaft), and mechanical stops and/or detents can be used to position the disrupter such that the projectile emitted thereby will impact the target at the desired location.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In one embodiment, an aiming system includes a first member securable to a device for generating directed electromagnetic radiation from a point source, a second member selectably rotatable about a first axis relative to the first member, a third member selectably rotatable about a second axis oriented non-parallel to the first axis, and an aiming member having a third axis, the aiming member connected to the third member. The aiming system further provides a selectable rotation about each of the first axis and the second axis can be independently performed. During the selectable rotation about each of the first axis and the second axis with the aiming member in the first position, the point source, a point on the first axis, a point on the second axis, and a point on the third axis are maintained mutually coincident with each other.

In another embodiment, a method of aiming a collimated beam includes providing an aiming device having a first member rotatably connected about a first axis to a second member rotatably connected about a second axis to a third member connected to an aiming member having a third axis, the aiming member for securing a collimated beam device for generating a collimated beam coincident with the third axis. The method further includes securing the first member to an object having a point source, selectably rotating the second member, the third member, and the aiming member about the first axis, and selectably rotating the third member and the aiming member about the second axis with the aiming member in a first position. The method further includes a selectable rotation about each of the first axis and the second axis can be independently performed. During the selectable rotation about each of the first axis and the second axis, the point source, a point on the first axis, a point on the second axis, and a point on the third axis are maintained mutually coincident with each other.

In a further embodiment, an aiming system includes a first member securable to a device having a point source, a second member selectably rotatable about a first axis relative to the first member, a third member selectably rotatable about a second axis oriented non-parallel to the first axis, and an aiming member having a third axis, the aiming member connected to the third member. The aiming system further includes a selectable rotation about each of the first axis and the second axis can be independently performed. During the selectable rotation about each of the first axis and the second axis with the aiming member in a first position, the point source, a point on the first axis, a point on the second axis, a point on the third axis are maintained mutually coincident with each other.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

The aiming system and method of aiming a collimated beam of the present invention may be usable for achieving an aim point as previously discussed, for example, with technologies disclosed in Applicant's U.S. Pat. Nos. 8,746,561, 9,055,886, 9,186,116, and 9,261,337, the contents of each of which are incorporated by reference in their entireties, and are not further discussed herein.

Figure 1:
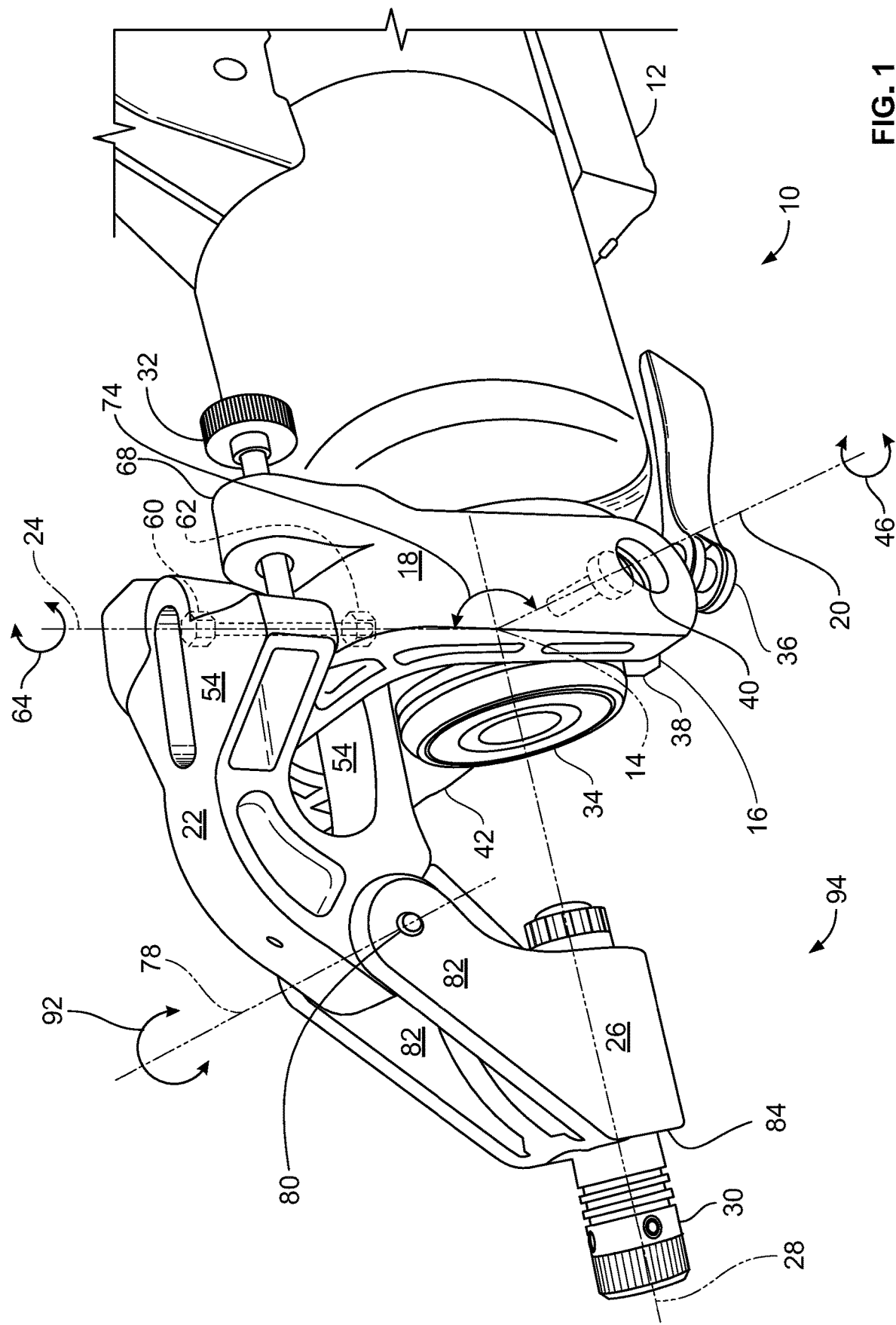
FIG. 1 shows an upper perspective view of an exemplary aiming system according to the present invention.

FIG. 1 shows an aiming system 10 for use with a radiation generating device or device 12 or a radiation source (e.g., an x-ray source) that is configured to generate or emit radiation from a point source 14. Aiming system 10 includes a first member 16 that is adapted to be secured to an end 34 of device 12 adjacent to point source 14, such as by a cam handle 36 that can urge opposed clamping portions 38 (one clamping portion 38 shown in FIG. 1) sufficiently toward one another around end 34 of device 12, or other apparatus or construction permitting aiming system 10 to be secured to device 12 by hand without tools.

Figure 2:
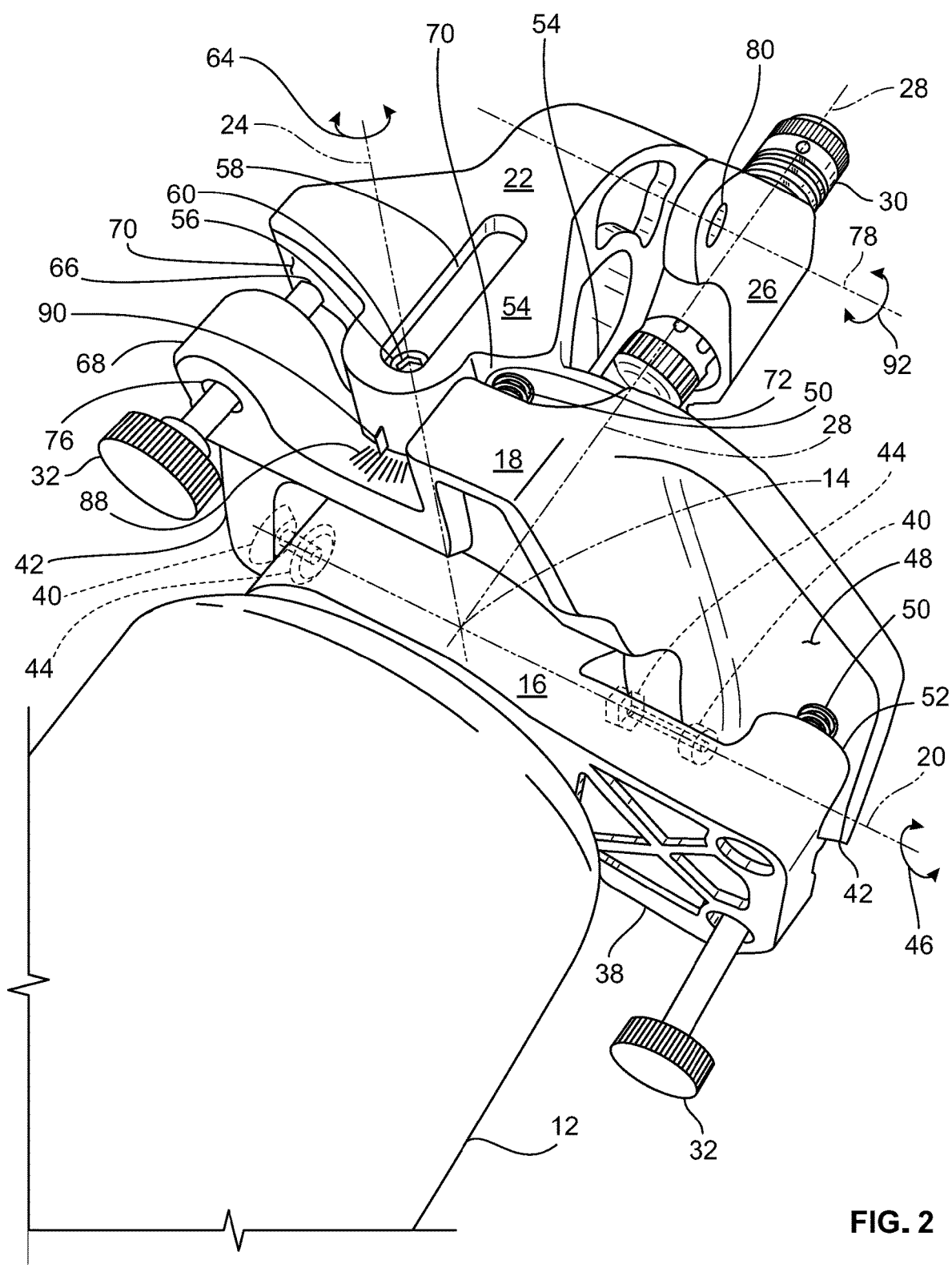
FIG. 2 is a reverse upper perspective view of the aiming system of FIG. 1 according to the present invention.

As shown in FIGS. 1 and 2, second member 18 is selectably rotatable about a first axis 20 relative to a first member 16. More specifically, a mechanical fastener, such as a bolt 40 extends through each of opposed legs 42 of second member 18, which bolts 40 being threadedly received by a corresponding nut 44 recessed in first member 16. The nuts and bolts 44, 40 are aligned with or coincident with first axis 20 and are assembled together in a manner permitting rotational movement 46 in both directions. In other embodiments, different mechanical fasteners, such as pins and corresponding retention members such as cotter pins, retaining rings, or constructions utilizing adhesive, welding or other technique may be used. Precise angular positioning or selectable rotation of second member 18 relative to first member 16 about first axis 20 is achieved by a threaded engagement adjustment device 32, in which an end (not shown in FIG. 2) of threaded engagement adjustment device 32 is further extended from first member 16 into abutment with an abutment surface 48 as a result of rotational movement applied to a knob of the threaded engagement adjustment device 32 in one direction to urge rotational movement in one sense or direction about first axis 20. Conversely, application of rotational movement to the knob of threaded engagement adjustment device 32 in an opposite direction or sense results in the end of the threaded engagement adjustment device 32 being retracted away from abutment surface 48 to achieve rotational movement in the opposite sense or direction about first axis 20. An anti-backlash device 50, such as a pre-loaded spring is disposed between abutment surface 48 of second member 18 and a corresponding facing surface portion 52 of first member 16. First axis 20 is positioned between the end of threaded adjustment device 32 and anti-backlash device 50 along first member 16, forming a first-class lever or "teeter totter" arrangement. During rotation of second member 18 about first axis 20 relative to first member 16, first axis 20 continuously intersects point source 14. Stated another way, during selectable rotation about first axis 20, a point of first axis 20 is maintained coincident with point source 14. Additionally, selectable rotation about first axis 20 may be performed independently of rotational movement about other axes of the system as will be discussed in additional detail below.

It is appreciated by those having skill in the art that structural members connected to second member 18 opposite first member 16, and not connected to first member 16, such as third member 22, and further including structural members linked together downstream of second member 18 and not directly connected to second member 18, such as aiming member 26, are likewise urged into rotational movement about first axis 20 in response to second member 18 being urged into rotational movement 46 about first axis 20.

As further shown in FIGS. 1 and 2, third member 22 is selectably rotatable about a second axis 24 relative to a second member 18. More specifically, a mechanical fastener, such as a bolt 60 is inserted into an opening 56 formed in a slot 58 that is formed in a leg 54 of third member 22, which bolt 60 extending through second member 18 before being threadedly received by a corresponding nut 62 recessed in an opposed leg 54 of third member 22. As shown in FIG. 1, first axis 20 and second axis 24 subtend an angle 74. In one embodiment, angle 74 is equal to 90 degrees, with second axis 24 corresponding to the azimuth orientation, and first axis 20 corresponding to the elevation orientation. In one embodiment, the angle 74 subtended between the first and second axes 20, 24 may be different than 90 degrees. The nut and bolt 62, 60 are aligned with or coincident with a second axis 24 and are assembled together in a manner permitting rotational movement 64 in both directions. Precise angular positioning or selectable rotation of third member 22 relative to second member 18 about second axis 24 is achieved by a threaded engagement adjustment device 32 threaded into a threaded opening 76 of a lobe 68 of second member 18, in which an end 66 of threaded engagement adjustment device 32 is further extended from first member 16 into abutment with an abutment surface 70 as a result of rotational movement applied to a knob of the threaded engagement adjustment device 32 in one direction to urge rotational movement in one sense or direction about second axis 24. Conversely, application of rotational movement to the knob of threaded engagement adjustment device 32 in an opposite direction or sense results in the end 66 of the threaded engagement adjustment device 32 being retracted away from abutment surface 70 to achieve rotational movement in the opposite sense or direction about second axis 24. An anti-backlash device 50, such as a pre-loaded spring is disposed between abutment surface 70 of third member 22 and a corresponding facing surface portion 72 of second member 18. Second axis 24 is positioned between the end 66 of threaded adjustment device 32 and anti-backlash device 50 along second member 18, forming a first-class lever or "teeter totter" arrangement. During rotation of third member 22 about second axis 24 relative to second member 18, second axis 24 continuously intersects point source 14. Stated another way, during selectable rotation about second axis 24, a point of second axis 24 is maintained coincident with point source 14.

Those skilled in the art will appreciate the novel arrangement of first, second and third members 16, 18, 22 defines a gimbal arrangement As shown in FIG. 2, spaced markings 88 may be utilized in combination with a pointer 90 to help indicate the azimuth orientation of a target point, such as the azimuth orientation of third axis 28 corresponding to collimated beam device 30. While not specifically shown, a similar spaced markings/pointer arrangement may also be utilized to help indicate the elevation orientation, such as the elevation orientation of a target point, such as third axis 28 corresponding to collimated beam device 30.

It is appreciated by those having skill in the art that structural members connected to third member 22 opposite second member 18, and not connected to second member 18, such as aiming member 26, and further including structural members linked together downstream of third member 22 and not directly connected to third member 22, would likewise be urged into rotational movement about second axis 24 in response to third member 22 being urged into rotational movement 64 about second axis 24.

As further shown in FIG. 1, an aiming device 26 is connected, such as rotatably connected for permitting rotational movement 92 about a fourth axis 78 relative to third member 22 via a mechanical fastener 80, such as a pin secured by a retaining ring, which fastener 80 extending through each of a pair of legs 82 of aiming device 26, as well as third member 22. Aiming device 26 includes an opening 84 having a third axis 28 adapted to receive a collimated beam generating device 30, such as a laser pointer providing a focused beam that provides a visual indication of the target point achieved by the aiming system 10 after the desired amount of rotational movements 46, 64 about respective first and second axes 20, 24 have been incorporated.

Figure 3:
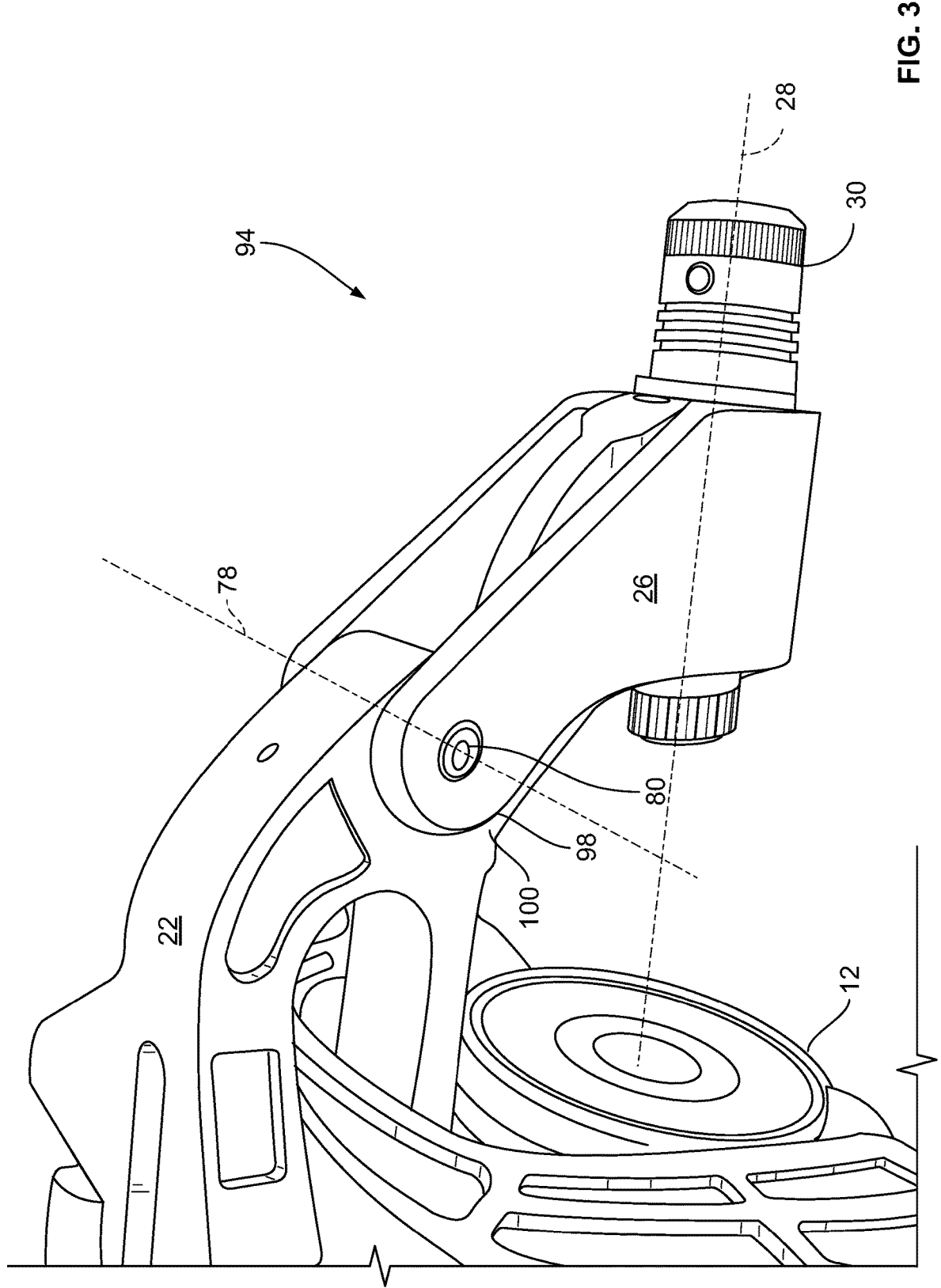
FIG. 3 is an enlarged, partial reverse upper perspective view of the aiming system of FIG. 1 according to the present invention.

As shown in FIGS. 1 and 3, aiming device 26 is in a first position 94 in which third axis 28 of aiming device is maintained coincident with point source 14 of device 12, irrespective rotational movement 46, 64 about first and second axes 20, 24. That is, when aiming device 26 is in first position 94, a point on or coincident with third axis 28 is maintained coincident with point source 14, with the other end of third axis 28 corresponding to the target point generated by collimated beam generating device 30. As shown in FIG. 3, first position 94 is achieved when abutment surface 98 of third member 22 is in physical contact or abutting abutment surface 100 of aiming device 26.

Figure 4:
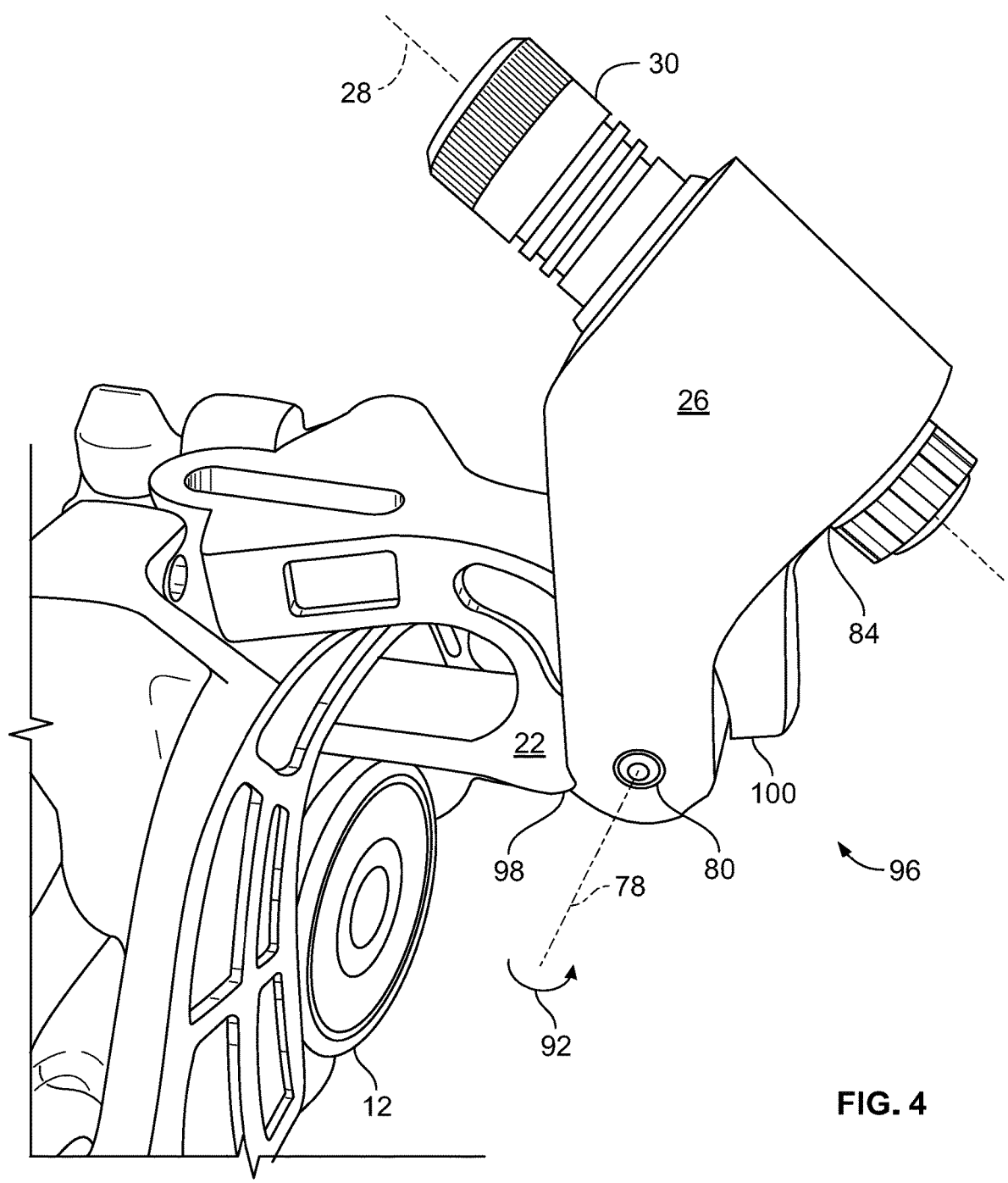
FIG. 4 is an enlarged, partial reverse upper perspective view of the aiming system of FIG. 3 with an aiming device in a retracted position according to the present invention.

As shown in FIG. 4, aiming device 26 is in a second position 96 when abutment surfaces 98, 100 are separated from each other as a result of rotational movement 92. Second position 96 may be desirable to more easily permit installation of collimated beam generating device 30 in opening 84 of aiming device 26, or when an operator wants to operate the aiming system 10 without the aiming device in the path of radiation generating device 12.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aiming system comprising:
   a first member securable to a device for generating directed electromagnetic radiation from a point source;
   a second member selectably rotatable about a first axis relative to the first member;
   a third member selectably rotatable about a second axis oriented non-parallel to the first axis; and
   an aiming member having a third axis, the aiming member connected to the third member;
   wherein a selectable rotation about each of the first axis and the second axis can be independently performed;
   wherein during the selectable rotation about each of the first axis and the second axis with the aiming member in the first position, the point source, a point on the first axis, a point on the second axis, and a point on the third axis are maintained mutually coincident with each other.

2. The system of claim 1, wherein selectable rotation about each of the first axis and the second axis can be performed by hand without tools.

3. The system of claim 1, wherein the aiming device is movable between the first position maintaining the point on the third axis coincident with the point source, and a second position maintaining the point on the third axis non-coincident with the point source.

4. The system of claim 1, wherein the aiming device is adapted to receive a collimated beam generating device.

5. The system of claim 1, wherein the first axis and the second axis subtend an angle of 90 degrees.

6. The system of claim 1, wherein selectable rotation about each of the first axis and the second axis is achieved by a threaded engagement adjustment device.

7. The system of claim 6, wherein the threaded engagement adjustment device includes an anti-backlash device.

8. A method of aiming a collimated beam comprising:
providing an aiming device having a first member rotatably connected about a first axis to a second member rotatably connected about a second axis to a third member connected to an aiming member having a third axis, the aiming member for securing a collimated beam device for generating a collimated beam coincident with the third axis;
securing the first member to an object having a point source;
selectably rotating the second member, the third member, and the aiming member about the first axis; and
selectably rotating the third member and the aiming member about the second axis with the aiming member in a first position;
wherein a selectable rotation about each of the first axis and the second axis can be independently performed;
wherein during the selectable rotation about each of the first axis and the second axis, the point source, a point on the first axis, a point on the second axis, and a point on the third axis are maintained mutually coincident with each other.

9. The method of claim 8, wherein the step of providing the aiming member includes providing a collimated beam device.

10. The method of claim 8, wherein each of the steps of selectably rotating the second member, the third member, and the aiming member about the first axis, and selectably rotating the third member and the aiming member about the second axis can be performed by hand without tools.

11. The method of claim 8, wherein after the step of selectably rotating the third member and the aiming member about the second axis, further comprises the step of moving the aiming device between the first position maintaining the point on the third axis coincident with the point source, and a second position maintaining the point on the third axis non-coincident with the point source.

12. The method of claim 8, wherein the first axis and the second axis subtend an angle of 90 degrees.

13. The method of claim 8, wherein each of the steps of selectably rotating the second member, the third member, and the aiming member about the first axis, and selectably rotating the third member and the aiming member about the second axis is achieved by a threaded engagement adjustment device.

14. An aiming system comprising:
a first member securable to a device having a point source;
a second member selectably rotatable about a first axis relative to the first member;
a third member selectably rotatable about a second axis oriented non-parallel to the first axis; and
an aiming member having a third axis, the aiming member connected to the third member;
wherein a selectable rotation about each of the first axis and the second axis can be independently performed;
wherein during the selectable rotation about each of the first axis and the second axis with the aiming member in a first position, the point source, a point on the first axis, a point on the second axis, a point on the third axis are maintained mutually coincident with each other.

15. The system of claim 14, wherein selectable rotation about each of the first axis and the second axis can be performed by hand without tools.

16. The system of claim 14, wherein the aiming device is movable between the first position maintaining the point on the third axis coincident with the point source, and a second position maintaining the point on the third axis non-coincident with the point source.

17. The system of claim 14, wherein the aiming device is adapted to receive a collimated beam generating device.

18. The system of claim 14, wherein the first axis and the second axis subtend an angle of 90 degrees.

19. The system of claim 14, wherein selectable rotation about each of the first axis and the second axis is achieved by a threaded engagement adjustment device.

20. The system of claim 19, wherein the threaded engagement adjustment device includes an anti-backlash device.

* * * * *